United States Patent

[11] 3,630,095

| [72] | Inventor | David Stephen Eakin<br>3656 Garnet St. Apt. 212, Torrance, Calif. 90503 |
|---|---|---|
| [21] | Appl. No. | 33,613 |
| [22] | Filed | May 1, 1970 |
| [45] | Patented | Dec. 28, 1971 |

[54] VARIABLE-SPEED TRANSMISSION
9 Claims, 6 Drawing Figs.

[52] U.S. Cl. .................................................. 74/191, 74/796
[51] Int. Cl. ........................................... F16h 15/16, F16h 15/50
[50] Field of Search .......................................... 74/191, 796, 190, 190.5, 192

[56] References Cited
UNITED STATES PATENTS

| 898,327 | 9/1908 | Couch | 74/191 |
| 2,252,630 | 8/1941 | Heer | 74/191 |
| 3,529,491 | 9/1970 | Stauber | 74/640 |
| 3,530,742 | 9/1970 | Sfredda | 74/796 |

*Primary Examiner*—Arthur T. McKeon
*Attorney*—Alfons Puishes

ABSTRACT: A variable-speed transmission employing a hollow outer cone disposed for hooplike spinning around an axially sliding inner cone. A driving roller is arranged for a restricted orbital rotation about the longitudinal axes of the cone and keeps the mating surfaces in constant contact. The two cones may have the same taper so that when the inner cone is completely inside the outer cone the driving roller merely freewheels around the surface of the outer cone and no motion is imparted to it. As the inner cone is withdrawn an increasing speed of rotation is imparted to the outer cone by the roller spinning it around on the varying diameter of the inner cone in the manner of a hoop. The outer member may also be cylindrical as well as conical.

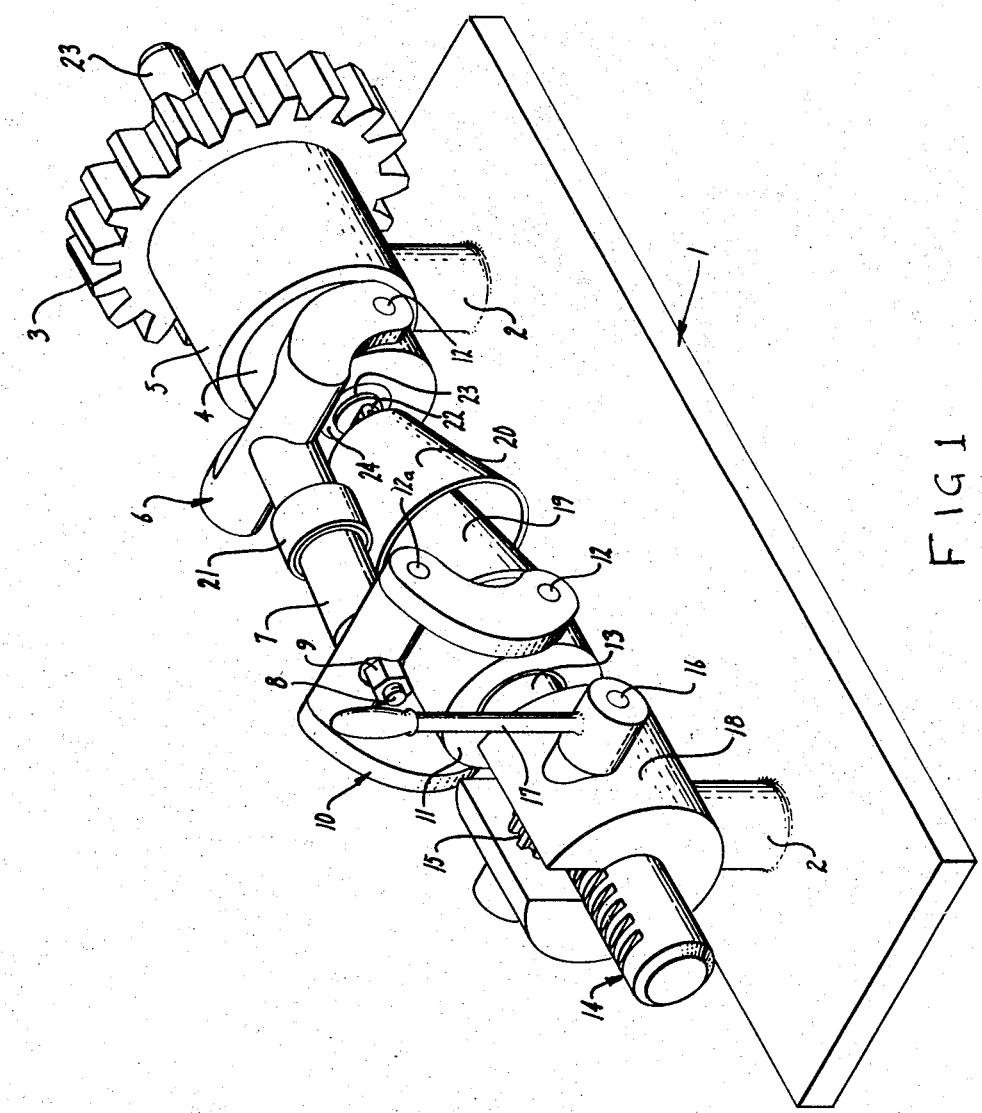

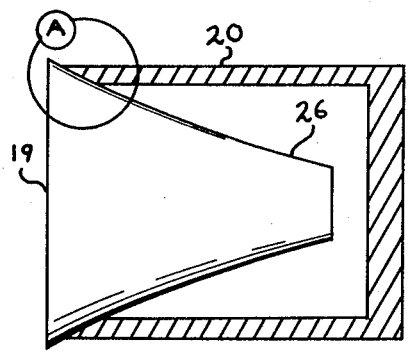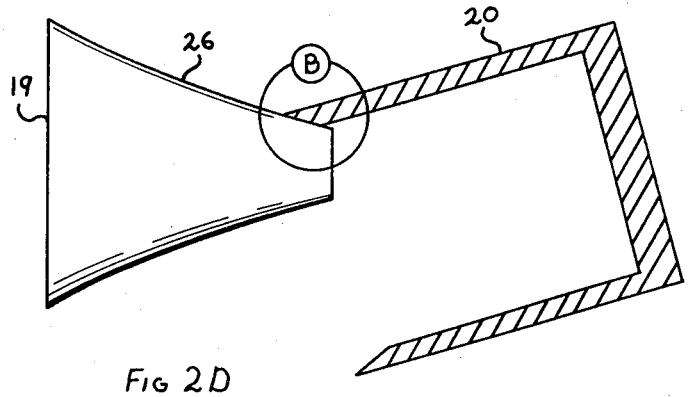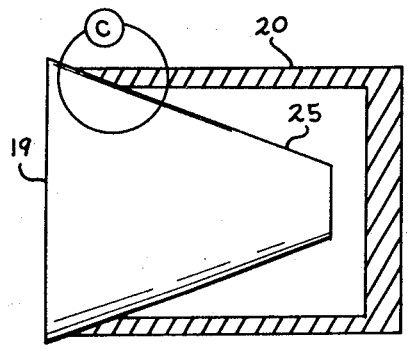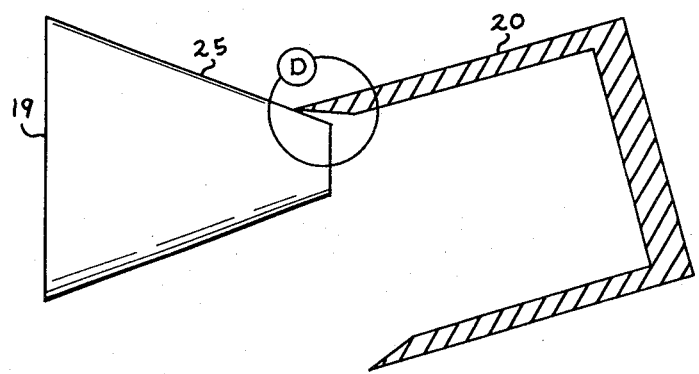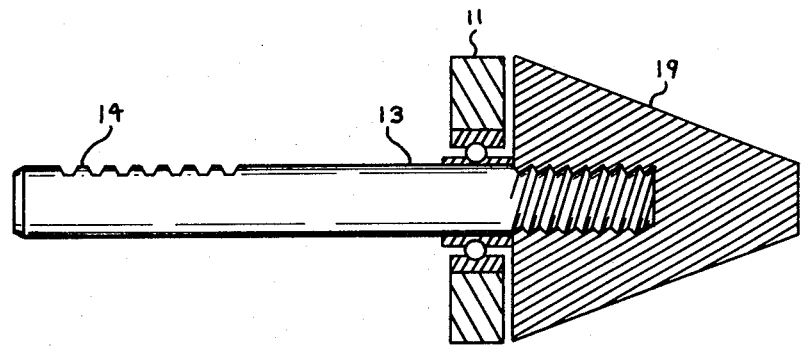

3,630,095

VARIABLE-SPEED TRANSMISSION

BACKGROUND OF THE INVENTION

Use of conical surfaces to effect speed variations is admittedly old.

All previous devices used employed mating or engaging conical surfaces or a combination of a conical and cylindrical surface. Power transmission from drive to driven usually relied on friction alone and was a function of the force normal or perpendicular to the contact surfaces.

Positive mechanisms of conical shape have been used also to advantage but these did not provide infinite variation without a resort to very complicated mechanisms. They were, moreover, subject to the usual mechanical objections to positive mechanisms, such as lack of flexibility, jamming, stripping, etc.

SUMMARY OF THE INVENTION

I have discovered a radically new principle and its application in connection with a variable speed power transmission. My discovery uses conical surfaces in cooperative relation but in an entirely different manner than has been done heretofore.

Specifically, I utilize a spinning hoop type of mechanism in which a hollow outer element spins or twirls around a conical element similar to the well-known "hula-hoop" phenomenon. By causing the hollow outer member to make contact along the varying diameter of the internal cone, I am able to vary the speed of rotation of the former and cause it to spin or twirl at any desired speed from zero up to a predetermined maximum, depending on the ratio between the diameter of my outer element and the diameter of the inner element at the point at which the two elements make contact.

Moreover, I do not rely entirely on normal pressure and surface friction between the moving parts. My mechanism embodies within itself a pinch effect which might be better characterized as a lever and fulcrum effect between the engaging rotating surfaces. This approaches the advantages of a positive mechanism but preserves the flexibility of a friction mechanism. The torque which may thus be transmitted is therefore greatly magnified.

DESCRIPTION OF THE DRAWINGS

FIG. 1 shows an isometric view of an assembly of one embodiment of my invention.

FIGS. 2A and 2B are schematic diagrams showing the relationship of my inner and outer members when using a straight conical section.

FIGS. 2C and 2D are schematic diagrams showing the relationship of my inner and outer members when using a curved conical section.

FIG. 3 is a side elevation partly in section showing in more detail the inside or operating cone of my invention with related members.

DESCRIPTION OF PREFERRED EMBODIMENTS

Referring now to FIG. 1, there is seen first the base 1 which is shown as merely a flat plate but may take the form of any method of support or housing in which the transmission of my invention may be located within a vehicle or machine which requires a variable speed mechanical power supply.

The pedestals 2 serve to support my device upon the base and these also may take a different configuration depending upon the application. The driver 3 is shown as a spur gear which derives its rotating motion from a mating pinion operating in constant speed, but this also may take the form as any other type of rotary motion.

The driver 3 is keyed or otherwise fastened to an outer stub shaft 4 which rides in an outer bushing or bearing 5.

Fixedly positioned on stub shaft 4 and rotating with it is a first revolving yoke 6 carrying with it roller shaft 7 which in turn rides on stud 8 and is secured by means of nut 9 to second revolving yoke 10 which comprises essentially a pair of shackles pivoted as shown to insure contact between the rolling surfaces. Second yoke 10 is positioned on bushing 11. Both revolving yokes are secured to their respective revolving members by means of holding pins 12. Yoke No. 10 is provided also with pins 12a.

Bushing 11 rides on shaft 13 which is arranged for axially sliding motion. Rack 14 forms an integral part of shaft 13 and may be propelled backward and forward in an axial direction by the action of pinion 15 riding on pinion shaft 16 and actuated by handle 17. The shaft 13, with its rack 14, is arranged to ride within slide bearing 18 which is split to accommodate pinion 15 as shown.

Inside cone 19 is positioned on shaft 13 from which is derived its forward and backward axial movement. This inner cone, however, does not rotate. Outside member 20, which may or may not be conical, is of hollow construction, is disposed to ride upon inside cone 19. Driver roller 21, which is rotatably mounted on roller shaft 7 serves to maintain contact between the conical surfaces of the inside cone 19 and the outside member 20. A universal joint 22 in the embodiment shown is arranged for positioning on the small end of the taper of the outside cone and connects to the driven shaft or output shaft 23 riding in inner bushing 24.

I may make both members 19 and 20 conical with the same taper to get superior results, although this is not entirely necessary for the successful operation of my invention.

Referring now more specifically to FIG. 2A and FIG. 2B, there is shown schematically relationship between my inner cone 19 and the outer member 20 in two extreme positions. In the position FIG. 2A the relationship between the two members is more definitely indicated by the circle C. When the outer member is at the highest point of taper on the inner member or cone 19. When the outer member is at the lower point of the taper, the relationship is more clearly indicated in the circle D. In order to eliminate what is obviously a disadvantage insofar as surface contact between these two members is concerned, I may utilize an inner conical member 19 which has curved sides 26 as distinguished from the straight tapered sides 25. FIGS. 2C and 2D show the corresponding positions of my inner and outer members 19 and 20 respectively as compared with that obtained in FIG. 2A and FIG. 2B. It is obvious by reference to the circle portion A in FIG. 2C and the circle portions B in FIG. 2D that I obtain a much improved surface contact between my members and consequently more efficient power transmission.

Reference to FIG. 3 will show the relationship of my internal cone 19 to its related parts. These elements form an important part of my invention, as set forth in the operation described below.

OPERATION OF TYPICAL EMBODIMENT

Assuming that my inside cone 19 and outside cone 20, which are more strictly speaking frustums of cones, have the same angle of taper and the same upper or narrow diameter and the same lower or wider diameter, we may start with the inside cone 19 completely inserted into outside cone 20 by the operation of handle 17, rack and pinion 14 and 15 and shaft 13. In this position, if rotation is imparted to driver 3, the yokes 6 and 10 will impart orbital motion of roller 21 about the central longitudinal axes of the two cones. Roller shaft 7, of course, is disposed to hold the cylindrical surface of roller 21 against the outer conical surface of cone 20 and the latter against the conical surface of inside cone 19. In this position the roller 21 merely "freewheels" about the conical surface of outside cone 20 and no motion is imparted to it.

As inside cone 19 is withdrawn axially, the action of roller 21 is such that it produces a twirling or hoop action about inside cone 19. Thus as inside cone is withdrawn axially, the speed of outside cone 20 increases and reaches a maximum at the smallest diameter of the taper of inside cone 19. The universal joint 22 then transmits this varying speed to the driven shaft 23 which represents the output of my device.

I have discovered that the "pinch" effect produced by driver roller 21 on outside cone 20 actually utilizes inside cone 19 as a fulcrum. The leverage thus obtained is highly advantageous in transmitting substantial amounts of torque, since there is no reliance on surface friction alone but the action approaches that of a positive relation between the rotating members.

I claim:

1. A variable-speed transmission device comprising:
   a driving roller disposed to revolve in an orbital path about a central axis;
   a rotating hollow frustoconical member positioned against said roller,
      the outer periphery of said roller engaging the outer conical surface of said member in rotating frictional relation therewith;
   a nonrotating frustoconical member positioned within the interior of said rotating member in sliding contact with the inner conical surface thereof;
   means for varying the relative axial position of said rotating member to said nonrotating member.

2. A variable-speed transmission device comprising:
   a first frustoconical member of hollow construction;
   a second frustoconical member positioned inside said first member;
   the outer conical surface of said second member being positioned for axial sliding relationship with the inner conical surface of said first member;
   a roller positioned against the outer conical surface of said first member and in rotating relationship therewith;
   a rotating shaft axially positioned on one end of said first member;
   driving means for revolving said roller in a circular orbit about the longitudinal axis of said second member;
   means for sliding said second member axially with relation to said first member;
   whereby a variable-speed of rotation is imparted to said rotating shaft on said first member.

3. The device of claim 2 in which the diameter at the base of said second conical member is at least equal to the diameter at the base of said first conical member.

4. The device of claim 2 in which said rotating shaft is positioned on the smaller end of said first member; a universal joint positioned between said end of said first member and said rotating shaft.

5. The device of claim 2 in which said means for sliding said second member axially comprises a rack and pinion.

6. A variable-speed transmission device comprising:
   a driving roller disposed to revolve in an orbital path about a central axis;
   a rotating hollow cylindrical member positioned against said roller,
      the outer periphery of said roller engaging the outer cylindrical surface of said member in rotating frictional relation therewith;
   a nonrotating frustoconical member positioned within the interior of said rotating member in sliding contact with the inner conical surface thereof;
   means for varying the relative axial position of said rotating member to said nonrotating member.

7. A variable-speed transmission device comprising:
   a cylindrical member of hollow construction;
   a frustoconical member positioned inside said cylindrical member;
   the outer conical surface of said frustoconical member being positioned for axial sliding relationship with the inner surface of said cylindrical member;
   a roller positioned against the outer surface of said cylindrical member and in rotating relationship therewith;
   a rotating shaft axially positioned on one end of said cylindrical member;
   driving means for revolving said roller in a circular orbit about the longitudinal axis of said frustoconical member;
   means for sliding said frustoconical member axially with relation to said cylindrical member;
   whereby a variable-speed of rotation is imparted to said rotating shaft on said cylindrical member.

8. The device of claim 6 in which the outer surface of said frustoconical member is curved.

9. The device of claim 7 in which the outer surface of said frustoconical member is curved.

* * * * *